United States Patent
Roddy et al.

[19]

[11] Patent Number: 5,889,603
[45] Date of Patent: Mar. 30, 1999

[54] OPTICAL DRIVE AWAY PREVENTION SECURITY SYSTEM

[75] Inventors: Timothy S. Roddy, Plymouth; LaVerne R. Newman, Southfield, both of Mich.

[73] Assignee: UT Automotive Dearborn, Inc., Dearborn, Mich.

[21] Appl. No.: 760,248

[22] Filed: Dec. 4, 1996

[51] Int. Cl.$^6$ ................................................ H04B 10/24
[52] U.S. Cl. ......................... 359/168; 359/143; 359/147; 359/171; 340/825.31
[58] Field of Search .................................. 359/168, 171, 359/169, 170, 159, 163, 147, 143; 340/825.31, 426, 532

[56] References Cited

U.S. PATENT DOCUMENTS

| | | | |
|---|---|---|---|
| 4,196,347 | 4/1980 | Hadley | 455/603 |
| 4,887,312 | 12/1989 | Dannhaeuser | 455/607 |
| 5,475,376 | 12/1995 | Chikamitue et al. | 340/825.31 |
| 5,561,420 | 10/1996 | Kleefeldt et al. | 340/825.31 |
| 5,610,574 | 3/1997 | Mutoh et al. | 340/825.31 |
| 5,635,900 | 6/1997 | Hasegawa et al. | 340/825.31 |
| 5,724,028 | 3/1998 | Prokup | 340/825.31 |
| 5,734,330 | 3/1998 | Nakamura | 340/825.31 |
| 5,745,026 | 4/1998 | Kokubu et al. | 340/825.31 |

FOREIGN PATENT DOCUMENTS

| | | |
|---|---|---|
| 3521822 | 6/1985 | Germany . |
| WO 8701980 | 5/1985 | WIPO . |
| WO 8700234 | 1/1987 | WIPO . |

*Primary Examiner*—Leslie Pascal
*Attorney, Agent, or Firm*—Howard & Howard

[57] ABSTRACT

The security system generally includes a key having an infrared transmitter and photocells which charge a power supply. The lock includes a pair of infrared receivers and a pair of light sources which charge the power supply in the key. The infrared transmitter in the key sends a key code to the lock via the infrared transmitter and the infrared receivers. A drive away prevention (DAP) module in the lock identifies the key code and enables the ignition of the vehicle.

18 Claims, 2 Drawing Sheets

OPTICAL DRIVE AWAY PREVENTION SECURITY SYSTEM

BACKGROUND OF THE INVENTION

The present invention relates generally to security systems, and more particularly to a vehicle system utilizing infrared communication and visible light for power coupling between a lock and key.

Current vehicle security systems typically include remote RF transmitters which transmit a security code to an RF receiver mounted on the vehicle. If a control module mounted on the vehicle recognizes the security code, the control module enables the ignition of the vehicle's engine. As is well known, the RF transmitted security code can be intercepted or "eavesdropped" by an unauthorized person with an RF receiver or a "code grabber." The unauthorized person can then later retransmit the intercepted code, unlocking the vehicle and enabling the ignition. As a result, many vehicle security systems have utilized complicated techniques involving encrypted or "rolling" security codes, in which, the RF transmitter continuously changes the security code. All RF transmitting systems have several other drawbacks. First, the RF transmitter must include a power source, such as a battery that degrades over time and must be replaced. Further, the RF signal can be jammed by RF or electromagnetic "noise," preventing operation of the RF system.

One known system utilizes an infrared transmitter on a key fob. An infrared receiver is typically mounted on the dome light or rearview mirror. The key fob transmits the security code to the infrared receiver, which then unlocks the vehicle. Although code grabbing is more difficult in this type of system, the security code can be intercepted by an unauthorized person. Further, the infrared transmitter includes a battery which degrades over time and must be replaced.

Another vehicle security system utilizes a small resistor mounted inside a key. When the key is inserted into the ignition lock, a circuit in the lock measures the resistance of the key. If the resistance value is recognized, the ignition is enabled. The system has two drawbacks. First, the electrical contacts on the key often wear out, become dirty or otherwise fail to make electrical contact with the lock, thereby preventing the owner of the vehicle from starting the engine. Further, unauthorized persons have developed keys having variable resistors which unlock any system of this type.

Another known vehicle system utilizes a small electronic circuit in a key which sends a coded signal via an RF transmitter built into the key. The RF transmitter is powered through electromagnetic coupling between the lock and the key. A coil on the lock provides an oscillating electromagnetic field which induces a current in a coil mounted in the key, thereby providing power to the RF transmitter. The RF transmission generated by this system can be intercepted as described above by unauthorized users. Further, the electromagnetic coupling which provides power to the key is relatively large, expensive and generates undesirable electromagnetic noise.

SUMMARY OF THE INVENTION

The present invention provides a security system having optical coupling for both code communication and for power coupling. Although the present invention is particularly useful for as a vehicle security system, it should be apparent that the present invention could also be utilized in a home security system or in a building security system.

The present invention generally includes a lock and key which are optically coupled for both code communication and power coupling. The key preferably includes at least one infrared transmitter which sends a key code by serial communication. The lock preferably includes at least one infrared receiver which receive the serially communicated key code from the infrared transmitter on the key.

The lock includes a Drive Away Prevention (DAP) module which receives the serially communicated key code and compares the key code to a plurality of authorized codes stored in the module. If the key code matches one of the authorized codes on an authorized code list, the DAP sends an ignition system enable code to an engine control module on the vehicle, thereby enabling the ignition of the vehicle engine.

Power coupling between the lock and key is preferably also optical. The key preferably includes a pair of photocells on the sides of the key. Insertion of the key into the lock turns on two charging lamps which direct visible light onto a pair of mirrors in a rotating key bezel onto the photocells, thereby providing electrical power to the key. The electrical energy generated by the photocells is preferably stored on the key, preferably in a "super-capacitor."

Each key is provided with a unique key code at the time the key logic circuitry is manufactured. The first two keys inserted into the ignition lock are learned by the DAP module. Additional keys can be added to the system, preferably by inserting a valid key into the lock to unlock the system while depressing the brake pedal. While holding the brake pedal depressed, the old key is removed and a new key with a new key code is inserted into the lock within ten seconds. The new key code is then stored to the authorized key code list in the memory of the DAP module. Preferably the DAP module stores only the most recent "n" number of key codes. In this manner, lost keys can be deleted from the valid key code list.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
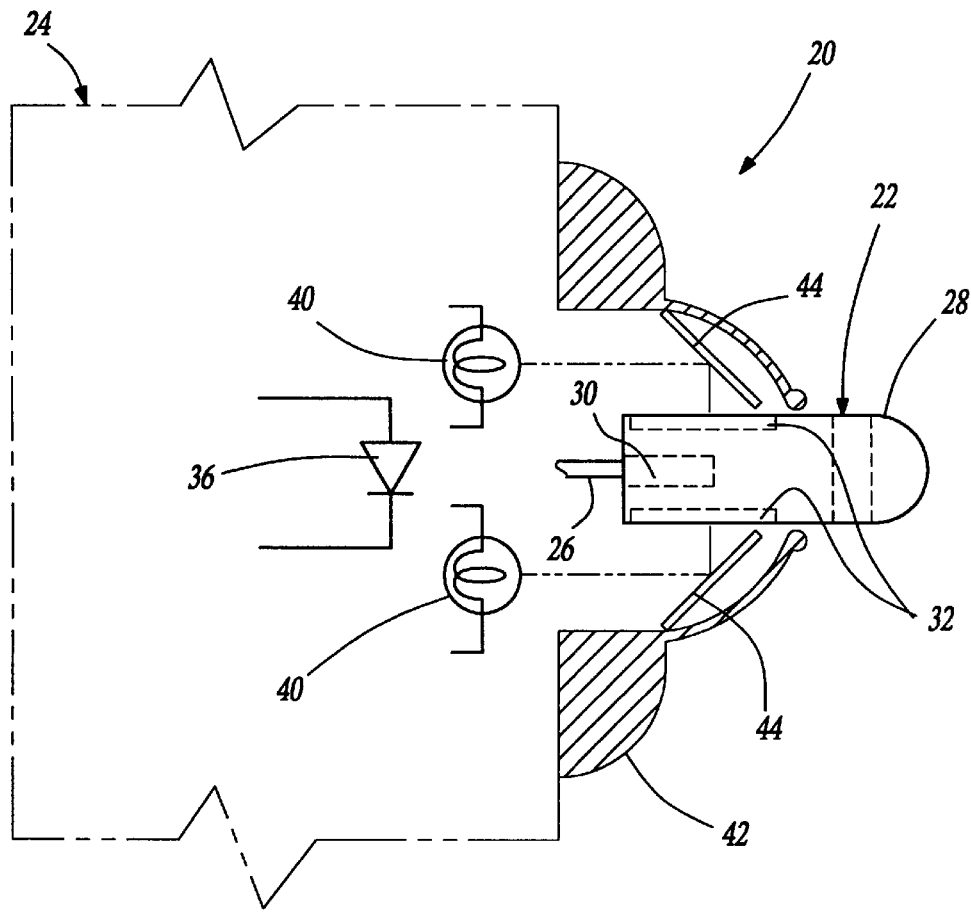
FIG. 1 is a schematic of the security system of the present invention.

Referring to FIG. 1, the security system 20 of the present invention generally includes a key 22 insertable into a lock 24. The key 22 generally includes a blade 26 extending forwardly from a handle 28. An infrared transmitter 30 is mounted in the handle 28 adjacent the blade 26. A photocell 32 is mounted on each of two opposite sides of the handle 28.

The lock 24 preferably includes upper and lower infrared receivers 36 (one shown). In order to accommodate insertion of the key 22 into the lock 24 with the infrared transmitter 30 oriented either upwardly or downwardly of the blade 26, one infrared receiver 36 is mounted above the blade 26 and one of the infrared receivers 36 is mounted below the blade 26, such that in either orientation of the key 22 the infrared transmitter 30 is adjacent one of the infrared receivers 36.

The lock 24 further includes two light sources 40 mounted on either side of the blade 26. The light sources 40 project light into a rotating bezel 42 into which the photocells 32 of the key 22 are contained. The bezel 42 preferably includes a pair of mirrors 44 reflecting light from the light sources 40 onto the photocells 32.

Figure 2:
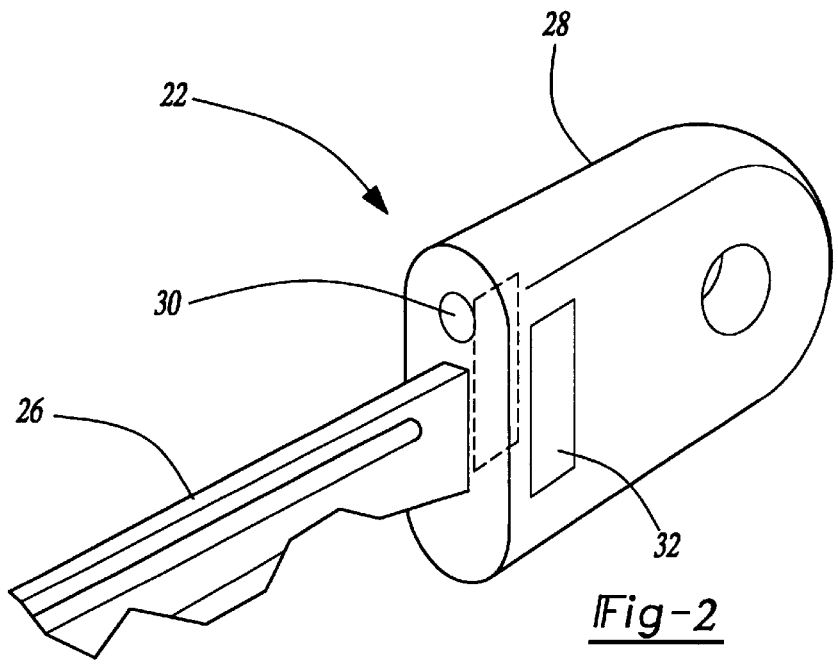
FIG. 2 is a perspective view of the key of FIG. 1.

As can be seen in FIG. 2, the blade 26 of the key 22 can be a blank blade, i.e. without teeth. As should be appreciated, there is no need for a mechanical lock with the present invention, although one could be used. The infrared transmitter 30 is mounted above the blade 26. The photocells 32 are mounted on opposing sides of the handle 28 of the key 22.

Figure 3:
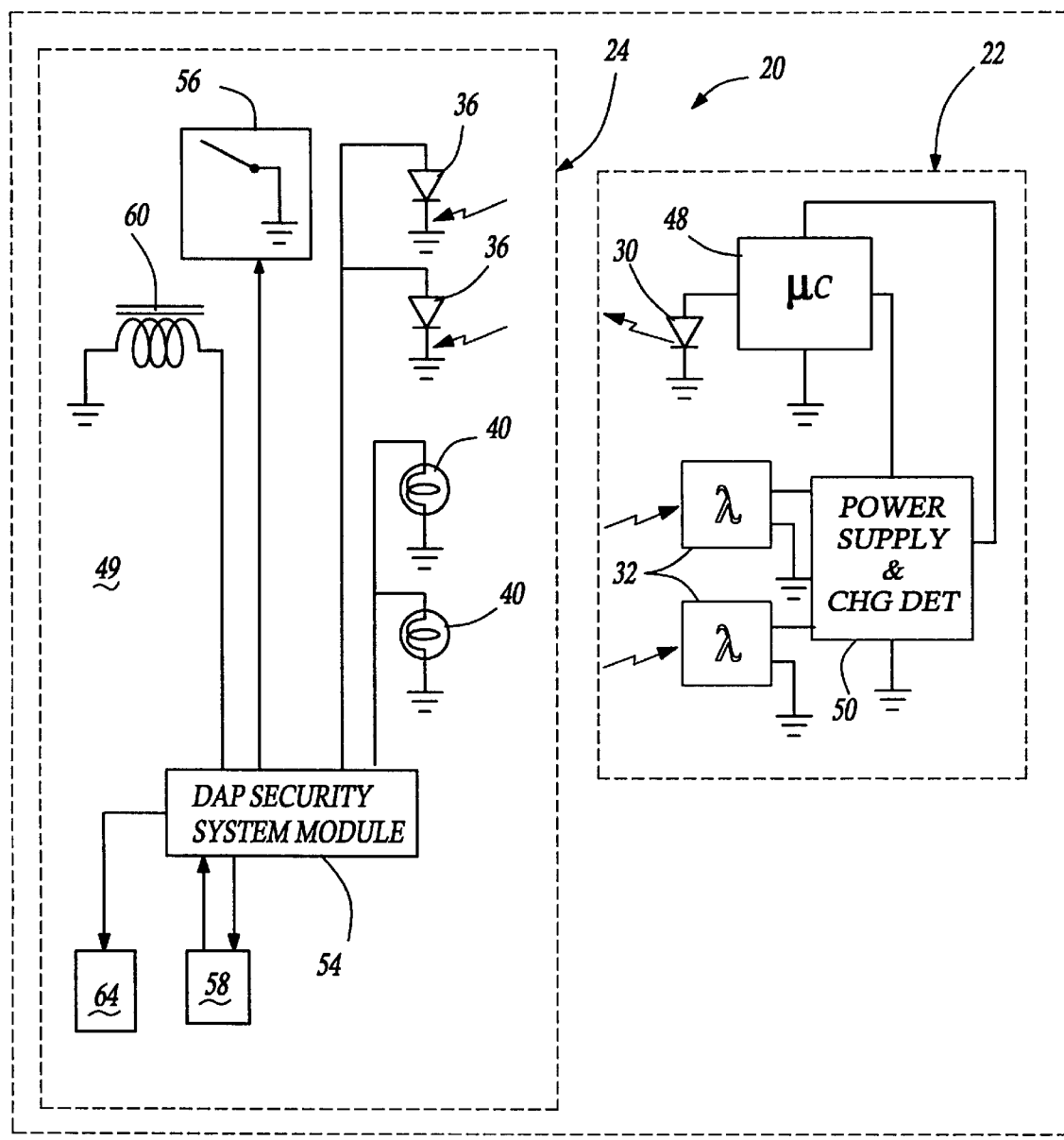
FIG. 3 is a schematic of the circuitry of the security system of FIG. 1 as installed in a vehicle.

A schematic of the circuit for the key 22 and the lock 24 as installed in a vehicle 49 is shown in FIG. 3. The infrared transmitter 30 is controlled by a micro controller 48 which is powered by a power supply 50. The power supply 50 is charged and recharged by photocells 32. The power supply 50 can be a battery or a "super capacitor" capable of maintaining an operable charge for over 60 days. If the key 22 is unused and uncharged for a longer period of time, it can quickly be recharged to an operational level by exposing the photocells 32 to bright light.

The lock 24 includes a drive away prevention "DAP" module 54. The DAP module 54 receives the signals from the infrared receivers 36 and controls the power to the light sources 40. A key-in-lock switch 56 is activated by insertion of the key 22 into the lock 24 and sends a signal to the DAP module 54. After receiving a valid key code, the DAP module 54 sends an ignition enable code to the engine control computer 58. The engine control computer 58 compares the ignition enable code with a predetermined ignition security code. Upon verification of the ignition enable code, the engine control computer 58 sends an "ignition on" signal back to DAP module 54. The DAP module 54 then activates an ignition unlocking solenoid 60 to permit rotation of the key 22 and bezel 42 in the lock 24. As a result, the key blade 26 need not be cut to operate a mechanical lock, but will be prevented from rotating if the key code is not an authorized code.

During manufacture, each key 22 is permanently programmed with a unique key code, which is stored in the micro controller 48. Preferably, the first two key codes of the first two keys 22 inserted into the lock 24 are learned by the DAP module 54. After the first two key codes are stored, no other key 22 will properly operate the system 20. Additional keys 22 with additional key codes can be added to the system 20 in the following manner. First, a valid key 22 having a first key code is inserted into the lock 24 and then removed when a brake pedal in the vehicle 49 is held depressed. Then, while holding the brake pedal depressed, the second key 22 having a second key code is inserted into the lock 24 within ten seconds. The second code of the new key is then stored in the DAP module 54 as an authorized code. Preferably, only a predetermined number "n" of key codes can be stored in the memory. In this manner, lost keys can be deleted from the authorized key code list.

When the key 22 is inserted into the lock 24, the key-in-lock switch 56 sends a signal to the DAP module 54. The DAP module 54 flashes the light sources 40 to send a "wake up" signal to the normally sleeping micro controller 48 in the key 22. Light from the light sources 40 is reflected onto the photocells 32 by the mirrors 44 in the rotatable bezel 42. The activated key 22 then transmits its key code serially via its infrared transmitter 30. The DAP module 54 receives the key code by way of one of the infrared receivers 36. The DAP module 54 then compares the key code with a plurality of authorized codes. If the DAP module 54 recognizes the key 22, the DAP module 54 sends an ignition enable code to the engine control computer 58, and the ignition unlocking solenoid 60 permits rotation of the key 22 and bezel 42. The vehicle 49 can be started only after the ignition enable code is sent to the engine computer 58. The key 22 is then turned in the lock 24 to the "start" position to activate the starter of the engine. It should be apparent that the DAP module 54 could be eliminated by integrating its functions into the engine control computer 58 in which case the engine control computer 58 would store a plurality of key codes as ignition enable codes. The operation of the security system 20 when installed in a vehicle 49 is transparent to the user, who can utilize the key 22 normally without taking any special steps to deactivate the security system 20. The user simply inserts the key 22 into the lock 24 and turns it in order to start the vehicle 49.

When the key 22 is turned in the lock 24 to the "on" position, the DAP module 54 activates the light sources 40 to recharge the power supply 50 of the key 22. Preferably, the key 22 periodically sends a charge status signal and the key code, indicating the current status of the power supply 50. The DAP module 54 turns off the light sources 40 when the power supply 50 is fully charged, thereby reducing heat build up around the key 22 and lock 24. The DAP module 54 periodically flashes the light sources 40 to again wake up the micro controller 48 of the key 22, thereby causing the key code and charge status to be resent. The charge status information is also used to detect problems in the power supply 50, photocells 32 or light sources 40. If the key 22 fails to recharge or does not retain a charge, the DAP module 54 activates an indicator 64 sending a warning signal to be communicated to the driver.

The security system 20 of the present invention provides optical code communication and power coupling. There are no metal contacts on the key 22 which would otherwise degrade. It is unaffected by RF noise or other external signals that would otherwise interfere or jam the security system 20. The key code cannot be intercepted or "grabbed" like current systems, thereby eliminating the need for encryption, or rolling security codes. The security system 20 is transparent to the user, who can use the key 22 and lock 24 normally, without taking extra steps to deactivate the security system 20.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A security system comprising:
   a key;
   at least one light transmitter on said key, said at least one light transmitter sending a key code;
   a photocell on said key powering said at least one light transmitter;
   a lock including at least one light receiver receiving said key code from said at least one light transmitter on said key, said lock comparing said key code with a predetermined authorized code, said lock unlocking based upon said comparison of said key code with said authorized code, said key being insertable into said lock in either of two orientations with said at least one light transmitter aligned with said at least one light receiver in each orientation;

a light source on said lock, said light source sending energy to said photocell on said key.

2. The security system of claim 1 further comprising:
an energy storage device on said key; and
said photocell charging said energy storage device.

3. The security system of claim 1 wherein said at least one light transmitter includes an infrared transmitter and said at least one light receiver includes an infrared receiver.

4. The security system of claim 1 wherein said key is inserted and rotated in said lock.

5. The security system of claim 1 wherein said at least one light receiver includes a pair of infrared receivers and said at least one light transmitter includes at least one infrared transmitter, said key being insertable into said lock in either of two orientations with said infrared transmitter aligned with one of the two infrared receivers in each of said orientations.

6. The security system of claim 1 wherein said lock is installed on a vehicle having an engine control computer, said lock sending an ignition enable code to said engine control computer based upon said comparison of said key code and said authorized code, said engine control computer comparing said ignition enable code with a predetermined ignition security code, said engine control computer permitting or preventing ignition of an engine of said vehicle based upon said comparison of said ignition enable code with said predetermined ignition security code.

7. The security system of claim 1 wherein said lock includes a memory storing a plurality of authorized codes.

8. The security system of claim 1 wherein said key code from said key is received by said lock and stored in a memory in said lock.

9. A vehicle security system comprising:
a key;
an infrared transmitter on said key sending a key code;
an energy receiver on said key, said energy receiver powering said infrared transmitter;
a lock mounted on said vehicle, said lock preventing said vehicle from starting when said lock is locked, said lock permitting starting of said vehicle when said lock is unlocked, said lock including a pair of infrared receivers receiving said key code from said key, said lock comparing said key code with a predetermined authorized code, said lock unlocking based upon said comparison of said key code with said authorized code, said key being insertable into said lock in either of two orientations with said infrared transmitter aligned with one of the two infrared receivers in each orientation;
an energy source on said lock, said energy source sending energy to said energy receiver on said key.

10. The security system of claim 9 wherein said energy receiver is a photocell and said energy source is a light source on said lock, said light source sending energy to said photocell on said key.

11. The security system of claim 9 further comprising:
an energy storage device on said key;
said energy receiver charging said energy storage device.

12. The security system of claim 9 wherein said vehicle includes an engine control computer, said lock sending an ignition signal to said engine control computer based upon said comparison of said key code and said authorized code.

13. A security system comprising:
a key;
a first communication device on said key, said first communication device sending a key code;
a photocell on said key powering said first communication device;
a lock including a second communication device receiving said key code from said first communication device on said key, said lock comparing said key code with a predetermined authorized code, said lock unlocking based upon said comparison of said key code with said authorized code;
a light source on said lock, said light source sending energy to said photocell on said key; and
an energy storage device on said key, said photocell charging said energy storage device, said first communication device indicating to said second communication device the charge status of said energy storage device.

14. The security system of claim 13 wherein said first communication device periodically indicates to said second communication device the charge status of said energy storage device.

15. The security system of claim 13 wherein said light source switches off in response to said second communication device receiving an indication from said first communication device that said energy storage device is charged.

16. The security system of claim 15 wherein said key includes a sleep mode, said key exiting said sleep mode and transmitting said charge status upon said photocell receiving light from said light source, said light source periodically switching on to cause said key to send the charge status.

17. A security system comprising:
a key having a blade extending in a first direction from a handle;
a wireless transmitter on said key transmitting a key code in a direction generally parallel to said blade;
at least one photocell on said handle of said key powering said transmitter, said at least one photocell oriented generally parallel to said key blade;
a lock into which said key blade is insertable, said lock including a receiver receiving said key code from said transmitter on said key, said transmitter positioned generally adjacent said transmitter in generally said first direction, said lock comparing said key code with a predetermined authorized code, said lock unlocking based upon said comparison of said key code with said authorized code, said lock including at least one light reflector generally adjacent said at least one photocell when said key is in said lock; and
a light source on said lock, said light source reflecting energy off of said at least one light reflector to said at least one photocell on said key.

18. The security system of claim 17 wherein said at least one photocell includes at least two photocells on opposite sides of said handle, said at least one light reflector including at least two light reflectors, each adjacent one of said at least two photocells when said key is in said lock, said light source reflecting energy off of said at least two light reflectors onto said at least two photocells.

* * * * *